United States Patent Office 3,475,306
Patented Oct. 28, 1969

3,475,306
PREPARATION OF HALOGENATED OLEFIN POLYMERS USING GASEOUS PHASE POLYMERIZATION IN THE PRESENCE OF A CARBONYL INITIATOR
Edwin T. Clocker, St. Paul, Minn., assignor to Ashland Oil & Refining Company, Ashland, Ky., a corporation of Kentucky
No Drawing. Filed Feb. 28, 1967, Ser. No. 619,151
Int. Cl. C08f 1/16
U.S. Cl. 204—159.23                    11 Claims

ABSTRACT OF THE DISCLOSURE

Admixing a carbonyl compound, such as acyl halide, with a halogenated olefin, such as tetrafluoroethylene, to form a gaseous mixture then exposing the gaseous mixture to actinic radiation and/or temperatures of 200° to 400° C. causes polymerization of the halogenated olefin.

---

The present invention relates to the preparation of polymers of halogenated olefins and more particularly to the gaseous polymerization of halogenated olefins.

The process of the present invention comprises forming a gaseous mixture of a polymerizable halogenated olefin and a carbonyl compound having the general formula:

wherein $R_1$ is a monovalent hydrocarbon radical, monovalent halogenated hydrocarbon radical, halogen, or hydrogen, and $R_2$ is a $R_1$ radical or a hydroxyl group when $R_1$ is a monovalent hydrocarbon or halogenated hydrocarbon radical, exposing such to actinic radiation or to temperatures in the range of 200° to 400° C. in the absence of actinic radiation, or to a combination thereof, and recovering a polymer of the halogenated olefin.

The initiator employed in the gas phase polymerization of the present invention is a carbonyl compound which is gaseous at the reaction temperatures. The term initiator as employed herein is defined as applying to a compound capable of starting or accelerating a polymerization regardless of its actual participation in the reaction. The necessity of maintaining the initiator in the gaseous state effectively limits the size of the hydrocarbon or halogenated hydrocarbon radical which can be attached to the carbonyl group. It will be apparent that the maximum size of the initiator molecule will depend on the reaction temperature employed which can vary significantly, particularly when actinic radiation is employed as the energy source. Preferably, the hydrocarbon or halogenated hydrocarbon radical contains no more than six carbon atoms and more preferably one or two carbon atoms. The halogen attached to the carbonyl group or attached to carbon of the halogenated hydrocarbon radical can be fluorine, chlorine, bromine, or iodine. The initiator can be employed over a wide range of concentrations and optimum initiator concentration will depend on the rate of polymerization and degree of polymerization desired. In general, initiator concentrations will be in the range of 0.01 to 20% by weight of the mixture. As indicated above, a wide range of carbonyl compounds can be employed to initiate the polymerization of the halogenated olefins. The preferred carbonyl compounds are acyl halides, halogenated acyl halides, alkanoic acids, halogenated alkanoic acids, aldehydes and ketones having from one to six carbon atoms. Specific examples of suitable initiators include acetic acid, acetaldehyde, formaldehyde, acetyl chloride, acetyl fluoride, acetyl bromide, dimethyl ketone, methylethyl ketone, trifluoroacetic acid, chlorodifluoroacetic acid, difluoroacetic acid, fluoroacetic acid, bromodifluoroacetic acid, trifluoroacetyl chloride, trifluoroacetyl bromide, chlorodifluoroacetyl chloride, bromodifluoroacetyl bromide, chlorodifluoroacetyl fluoride, trichloroacetaldehyde, trifluoroacetaldehyde, trifluoromethyl methyl ketone, bis-(difluoromethyl) ketone, and mixtures thereof.

The halogenated olefins which can be polymerized by the process of the present invention include all halogenated olefins heretofore found to be polymerizable by free radical initiation. In general, this includes olefins of one to four carbon atoms containing at least one halogen substituent. Preferred halogenated olefins are the halogenated ethylenes in which the halogen is chlorine or fluorine. In particular, these include tetrafluoroethylene, chlorotrifluoroethylene, vinylidene fluoride, vinyl fluoride and vinyl chloride. The halogenated olefins can, furthermore, be copolymerized with other ethylenically unsaturated compounds of the type disclosed in the art as being copolymerizable therewith using a free radical initiator. Specifically, such include hexafluoropropylene, ethylene, vinyl ether and fluorovinyl ethers. It is to be understood that the halogenated olefins can, furthermore, be copolymerized with each other using the process of the present invention.

The process of the present invention is carried out by forming a gaseous mixture of the halogenated olefin and the initiator as a first step of the process. This gaseous mixture can be preformed or can be formed at the reaction site. In the second step of the process, the mixture is subjected to an energy source which can be heat, actinic radiation or a combination of both. Thus, the polymer of the halogenated olefin is formed when the mixture is heated to a temperature of 200° to 400° C. preferably, temperatures in the range of 250° to 360° C. are employed. The resulting normally solid polymer forms a deposit on the surfaces within the reaction environment and particularly the coldest surface available. Depending on whether the surface on which the polymer is deposited is below or above the fusion point of the polymer, the deposit forms a particulate or a continuous coherent coating.

In place of using heat as the energy source, the necessary activation of the gaseous mixture to cause polymerization can also be accomplished by exposing the polymer to actinic radiation, i.e., light having wave lengths in the range of 2000 A. to 6000 A. and preferably in the range of 3100 A. to 4500 A. Actinic radiation sources are well-known in the literature and, therefore, need not be further described here. Employing actinic radiation, the initiation of the gaseous mixture becomes substantially independent of the temperature of gaseous mixture and can be conducted at room temperature. Preferably, however, the gaseous mixture is heated to the temperature required for the activation of the mixtures by heat alone, thereby combining thermal and actinic radiation energy. Using a combination of heat and actinic radiation, rapid and complete polymerization of the monomer is achieved. The process of the present invention can be carried out at subatmospheric, atmospheric, or superatmospheric pressure; optimum pressures depending on other process conditions and process equipment. The process of the present invention, furthermore, can be conducted in the absence of any other gaseous components.

The process of the present invention, aside from making halogenated olefin polymers which are of known utility as plastics and lubricants, is of particular utility in preparing coated articles. In particular, the process can be employed to coat articles of intricate shapes. In preparing such coatings, additional monomer or monomer and initiator is fed to the polymerization zone until the desired thickness of polymer has been deposited on the surface. The coated article is then removed and, depending on the reaction temperature, is obtained as a fused coating or as a particulate coating requiring fusion by heating above the fusion point.

The invention is further illustrated by the following examples in which all parts or percentages are by weight unless otherwise indicated.

Examples 1–4

Into a nitrogen-purged evacuated 250 ml. "Vicor 7910" glass reaction chamber was charged a mixture of the gases indicated in Table I below until atmospheric pressure was established in the reaction system. The reaction chamber was connected to a calibrated reservoir containing a floating plunger which allowed measurement of gas volume removed from the reservoir. This reservoir was also filled to atmospheric pressure with the gas mixture shown in Table I below. The reaction chamber was then exposed to actinic radiation from a Hanovia lamp and the rate of gas depletion corresponding to the rate of tetrafluoroethylene polymerization was measured. The polymerization was permitted to go to completion. In each instance the tetrafluoroethylene was polymerized to a solid polymer weighing about 1 gram.

TABLE I

| Example: | Reaction mixture | Relative polymerization rate |
|---|---|---|
| 1 | 95% TFE;* 5% $CF_3COCl$ | 40 ml./5 min. |
| 2 | 90% TFE; 10% $CF_3COCl$ | 50 ml./5 min. |
| 3 | 80% TFE; 20% $CF_3COCl$ | 55 ml./5 min. |
| 4 | 90% TFE; 10% $CH_3COCl$ | 80 ml./5 min. |

*Tetrafluoroethylene.

Examples 5–17

Following substantially the procedure of Examples 1–4, the initiators listed in Table II hereinbelow were admixed in 10% concentration with tetrafluoroethylene and the mixture charged at atmospheric pressure to the reactor and reservoir. The table indicates the yield of polytetrafluoroethylene obtained. In all instances a solid polymer was obtained.

TABLE II

| Example: | Initiator | Percent Yield of PTFE |
|---|---|---|
| 5 | None | *6 |
| 6 | $CH_3COOH$ | 11 |
| 7 | $CF_2ClCOOH$ | 60 |
| 8 | $CF_3COOH$ | 72 |
| 9 | $CH_3COCl$ | 80 |
| 10 | $CF_2ClCOCl$ | 72 |
| 11 | $CF_3COCl$ | 76 |
| 12 | $COCl_2$ | 76 |
| 13 | $CH_3CHO$ | 64 |
| 14 | $C_6H_5CHO$ | 11.1 |
| 15 | CO | 8.5 |
| 16 | $Cl_3CCHO$ | 49 |
| 17 | $CH_3COC_2H_5$ | 64 |

*Believed to be due to the presence of impurities.

Example 18

A square glass reactor, the top side of which comprised a removable quartz plate, was equipped with gas charging and evacuating means, hot plate, and thermocouple. A metal panel was placed on the hot plate. The reactor was sealed, purged with nitrogen and evacuated. The metal panel was then heated to 250 C. and exposed to light of a Hanovia lamp through the quartz plate. The reactor was then charged to substantially atmospheric pressure with a 10% trifluoroacetyl chloride, 90% tetrafluoroethylene mixture. Additional quantities of the mixture were charged to maintain the pressure as polymerization proceeded. A powdery coating formed on the metal panel. The resulting coating was heated to 327° C. to form a coherent continuous coating on the metal panel.

Example 19

A glass reactor was heated to a temperature within the reactor of about 260° to 300° C. To this reactor was charged, on purging with nitrogen, 100 ml. of a tetrafluoroethylene polymerization charge containing in addition to the tetrafluoroethylene 20, 10, 5, and 1% by volume respectively of a gaseous mixture of predominantly trifluoroacetyl chloride with minor amounts of difluoromonochloroacetyl fluoride. In each instance a solid polymer of tetrafluoroethylene was obtained in the reactor.

The foregoing examples have illustrated the process of the present invention as applied to various initiators within the scope of the present invention and have illustrated various means of accomplishing the polymerization. The particular methods illustrated are equally useful with other monomers and initiators not specifically demonstrated in the examples but included within the scope of the present invention. Obviously, various modifications and alterations can be made in the particular equipment and methods shown in the examples and such are deemed to be within the scope of the invention.

What is claimed is:

1. A process for polymerizing a polymerizable halogenated olefin which comprises forming a gaseous mixture of said olefin and from 0.01 to 20% by weight of the mixture of a carbonyl compound having the formula:

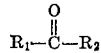

wherein $R_1$ is a monovalent hydrocarbon radical, a monovalent halogenated hydrocarbon radical, halogen, or hydrogen, and $R_2$ is a monovalent hydrocarbon radical, a monovalent halogenated hydrocarbon radical, halogen or hydrogen, or, when $R_1$ is a hydrocarbon radical $R_2$ may be a halogenated hydrocarbon radical, hydroxy, subjecting such mixture to actinic radiation or to temperatures in the range of 200° to 400° C. in the absence of actinic radiation and recovering a polymer of said halogenated olefin.

2. The process of claim 1, wherein the hydrocarbon radical or the halogenated hydrocarbon radical contains from one to six carbon atoms.

3. The process of claim 1, wherein $R_1$ is methyl, halomethyl or halogen, and $R_2$ is hydrogen or halogen.

4. The process of claim 1, wherein the polymerizable halogenated olefin is a halogenated ethylene containing from one to four halogens.

5. The process of claim 1, wherein the polymerizable olefin is tetrafluoroethylene.

6. The process of claim 3, wherein the polymerizable halogenated olefin is tetrafluoroethylene.

7. The process of claim 1 wherein the gaseous mixture is subjected to actinic radiation.

8. The process of claim 7, wherein the halogenated olefin is tetrafluoroethylene, chlorotrifluoroethylene, vinyl fluoride, vinylidene fluoride, or vinyl chloride.

9. The process of claim 8, wherein the initiator $R_1$ is methyl, halomethyl, or halogen, and $R_2$ is hydrogen or halogen.

10. The process of claim 9, wherein the halogenated olefin is tetrafluoroethylene.

11. In a process for polymerizing a polymerizable halogenated olefin, the improvement which comprises conducting the polymerization in the gas phase with a mixture of the olefin and an initiator under actinic radiation or at a temperature of 200° to 400° C. in the absence of actinic radiation, said initiator being present in a concentration of at least 0.01% by weight of the mixture and said initiator having the formula:

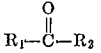

wherein $R_1$ is a monovalent hydrocarbon radical, a monovalent halogenated hydrocarbon radical, halogen or hydrogen and $R_2$ is a monovalent hydrocarbon radical, a monovalent halogenated hydrocarbon radical, halogen or hydrogen, or, when $R_1$ is a hydrocarbon radical or halogenated hydrocarbon radical, $R_2$ may be hydroxy.

References Cited

UNITED STATES PATENTS

| | | | |
|---|---|---|---|
| 3,228,865 | 1/1966 | Vogh | 204—159.23 |
| 2,912,373 | 11/1959 | Carlson | 204—159.23 |

OTHER REFERENCES

Delzenne: Les Stabilisateurs de Photopolymerization Industrie Chimique Belge, vol. 24, No. 7 (1959), pp. 748–739.

MURRAY TILLMAN, Primary Examiner

RICHARD B. TURER, Assistant Examiner

U.S. Cl. X.R.

96—115; 260—92.1, 92.8